Sept. 11, 1962  Y. J. LUBKIN  3,054,055
NON-LINEAR DEVICE TEST APPARATUS
Filed Jan. 7, 1960  2 Sheets-Sheet 1

INVENTOR
YALE J. LUBKIN
BY
ATTORNEYS

Sept. 11, 1962   Y. J. LUBKIN   3,054,055
NON-LINEAR DEVICE TEST APPARATUS
Filed Jan. 7, 1960   2 Sheets-Sheet 2

INVENTOR
YALE J. LUBKIN
BY
ATTORNEYS

United States Patent Office 3,054,055
Patented Sept. 11, 1962

3,054,055
NON-LINEAR DEVICE TEST APPARATUS
Yale J. Lubkin, Port Washington, N.Y., assignor to Cutler-Hammer, Inc., Milwaukee, Wis., a corporation of Delaware
Filed Jan. 7, 1960, Ser. No. 991
10 Claims. (Cl. 324—158)

This invention relates to apparatus for testing non-linear devices, particularly crystal diodes and the like. It is especially directed to apparatus for making D.C. test measurements on crystal diodes to determine the excellence thereof as microwave video detectors.

Crystal diodes are widely used at the present time in electronic circuits. Among the important applications are those in microwave receivers where they may be employed as mixers or as video detectors. When used as a mixer, the crystal commonly produces a beat frequency output from a pair of R-F input frequencies. When used as a video detector, the crystal commonly converts a modulated R-F frequency directly to a video frequency. It will be understood that the term "video frequency" is used in its broad sense, and is not limited to conveying picture information as in television. Thus, video detector crystals may be employed in radar and similar types of microwave receivers.

The power levels involved in mixer and video detector applications are commonly quite different, that for a mixer being usually high level (e.g., in the milliwatt region) and that for video detection being low level (e.g., in the microwatt region). The crystal characteristics are usually quite different in these two regions, and diodes performing satisfactorily as mixers may not be good video detectors, and vice versa. Also, small biases are often employed for video detectors to improve their performance, and its is important to be able to determine their excellence in the presence of such biases.

Particularly in the case of microwave receivers, the quality of the crystal diodes may be of paramount importance in the overall receiver performance. It is therefore seen that testing to insure proper performance is of considerable value. In addition, it is often required that crystals be matched for particular applications.

Test setups involving R-F equipment may be fairly expensive, particularly microwave test setups, and a highly skilled operator is required. Experience has shown that the results obtained by using R-F measuring techniques may vary considerably from measurement to measurement. This is true not only for different operators, but even for the same operator. Furthermore, the cost and bulk of R-F test equipment limits its usefulness, particularly in field applications where portability becomes important.

D.C. type testers which measure the forward and backward resistance of crystal diodes are of limited usefulness, and have not been found satisfactory for predicting actual R-F performance capability. A D.C. crystal checker is described in U.S. Patent 2,585,353 to Strum which has been found very useful for many purposes, particularly in testing mixer crystals. However, it has been found that the results obtained do not show a satisfactory correlation with R-F measurements in the case of video crystal detectors for microwave frequencies.

It is accordingly a primary object of the present invention to provide a simple, portable D.C. crystal diode tester which will permit an adequate evaluation of the performance of video detector crystals, without requiring a highly skilled operator. Although particularly directed to the testing of video detector crystals, the tester may be found useful in other applications where the parameters determined are significant.

The tester of the invention utilizes a special bridge circuit and D.C. sources to determine the D.C. resistance $\underline{R}$ of a crystal for a selected current bias $\underline{I}$, and the ratio of the crystal resistance for an incremental current flow to the D.C. resistance, at the selected current bias. The bridge utilizes a variable balancing resistance in one arm to give the D.C. resistance. An increment of current is then caused to flow through the crystal, thereby unbalancing the bridge. The bridge is rebalanced by causing a current equal to a fraction $\alpha$ of the incremental crystal current to flow through the balancing resistor of the first bridge. The quantity $\alpha$ then represents the ratio of the resistance of the crystal for incremental current flow to the D.C. resistance.

A criterion of excellence of a video crystal has heretofore been developed and termed the "figure of merit," designated M. This criterion involves the current sensitivity $\beta$ of the crystal (the ratio of the rectified current $i$ to the R-F power input of the crystal) and the A.C. or video resistance $r$ of the crystal.

A related criterion called "tangential sensitivity" is also often employed. This quantity is usually evaluated by noise measurements utilizing oscilloscope techniques, and involves judgment on the part of the operator. Hence consistency is difficult to attain.

It has been found that the quantities R and $\alpha$ determined by the tester of the invention can be used to calculate the figure of merit and tangential sensitivity of the crystal, and that excellent correlation with R-F measurements can be obtained.

Before describing the tester in detail, expressions will be developed for the figure of merit and tangential sensitivity in which the quantities determined by the tester can readily be inserted for calculation.

The figure of merit for video diodes is a number that is proportional to the signal-to-noise ratio obtainable with a given power input and a given bandwidth. The voltage output of the diode can be expressed as the product of the detected current $i$ and the video resistance $r$. The detected current $i$ can be expressed as the product of the current sensitivity $\beta$ and the input R-F power $p$ to the diode. The noise voltage developed in a receiving system having a given bandwidth is proportional to the square root of the total noise resistance. This resistance is equal to the sum of the diode video resistance $r$ and the equivalent input noise resistance $R_A$ of the video amplifier which customarily follows the video detector.

From these considerations a detector figure of merit M has been developed which is expressed by the equation:

$$M = \beta \frac{r}{\sqrt{r + R_A}} \qquad (1)$$

To a good approximation, $R_A$ can ordinarily be neglected, giving:

$$M \doteq \beta \sqrt{r}$$

For example, $r$ is usually at least 1000 ohms and $R_A$ less than 200 ohms in a good video amplifier at the present time. For these values the approximation gives an error of about 10% or 0.4 db. For larger values of $r$, or smaller values of $R_A$, the error is less.

Analytical expressions for $\beta$ can be obtained by mathematically deriving equations for the detection current $i$ and input power $p$ from the diode characteristics. It is well known in the art that the forward characteristic of a crystal diode operated at low power input levels can be closely approximated by the equation:

$$I = kE^x \quad (3)$$

where:

$I$ = crystal current
$k$ = a constant
$E$ = voltage across crystal
$x$ = a number, generally between one and ten.

The D.-C. conductance G of the diode (reciprocal of R) is given by the equation:

$$G = I/E = kE^{x-1} \quad (4)$$

The small signal A.-C. conductance $g$ is given by the equation:

$$g = \frac{dI}{dE} = kxE^{x-1} = xG \quad (5)$$

The corresponding relationship between D.-C. and A.-C. or video resistance is given by the equation:

$$R = xr \quad (6)$$

The detection efficiency of a video detector can be determined by computing the amount of detection current (i.e. change in average current) that is produced by the diode in response to a small signal voltage or perturbation superimposed on a steady current bias. With $x$ greater than one, current flow through the crystal will increase more when E increases by a given amount than it will decrease when E decreases by a like amount. Therefore there will be a net increase in average current flow through the crystal which is the detected current.

In the mathematical analysis that is considered here, a small square-wave R-F signal is employed as the voltage perturbation. However, the results obtained using a sine wave input signal are similar. With a square wave voltage perturbation (50% duty cycle) superimposed on a D.-C. bias voltage E, the voltage perturbation can be expressed as $$e = E + \frac{1}{2}\epsilon$$

and $$e = E - \frac{1}{2}\epsilon$$

on alternate half cycles. Using Equation 3, the mean value of current $\bar{I}$ during the square-wave cycle is found to be:

$$\bar{I} = \frac{1}{2}k[(E+\frac{1}{2}\epsilon)^x + (E-\frac{1}{2}\epsilon)^x]$$
$$= kE^x + \frac{1}{8}kx(x-1)E^{x-2}\epsilon^2 + \ldots \quad (7)$$

The higher order terms are relatively small and can be neglected. Thus the detected current $i$ can be expressed as:

$$i = \bar{I} - I$$
$$\doteq 1/8 kx(x-1)E^{x-2}\epsilon^2$$
$$\doteq 1/8 g(x-1)\frac{\epsilon^2}{E} \quad (8)$$

The input perturbation power $p$ can be expressed as:

$$p = \frac{(\epsilon/2)^2}{r} \quad (9)$$
$$= \frac{1}{4}g\epsilon^2$$

Using Equations 8 and 9, the current sensitivity $\beta$ referred to above can then be expressed as follows:

$$\beta = \frac{i}{p} \quad (10)$$
$$= \frac{(x-1)}{2E}$$
$$= \frac{(x-1)}{2IR} \quad (11)$$

Substituting $R/r$ for $x$ in accordance with Equation 6 gives:

$$\beta = \frac{(R/r - 1)}{2IR} \quad (12)$$

The figure of merit M given by Equation 2 can then be expressed as:

$$M = \frac{R/r - 1}{2IR}\sqrt{r} \quad (13)$$

Tangential sensitivity (TS) can be defined as the power input that produces a signal-to-noise ratio of 4 db. It depends on the detector figure of merit M and the bandwidth (BW) employed, and can be expressed as:

$$TS\ (dbm) = 10 \log M - 5 \log (BW) + \text{constant} \quad (14)$$

The constant includes a figure which takes care of the 4 db signal-to-noise ratio and other factors known in the art. It will commonly be different for different crystal types, and can be evaluated by RF measurements for each crystal type.

From Equation 13 it will be seen that the figure of merit M used in Equation 14 can be evaluated on the basis of I, R and r. As before mentioned, the crystal tester of the present invention permits determining R for a selected bias current I. As will be described hereinafter in connection with the specific embodiment, the quantity $\alpha$ determined by the tester is equal to $r/R$. By making this substitution in Equation 13:

$$M = \frac{1}{2I\sqrt{R}} \cdot \frac{1-\alpha}{\sqrt{\alpha}} \quad (15)$$

By using Equation 15, the figure of merit for the crystal can readily be calculated from measurements made with the tester of the invention, and further calculations made in accordance with Equation 14 in order to determine tangential sensitivity. Once the constant in Equation 14 has been evaluated for a particular crystal type, the computation of tangential sensitivity for a given bandwidth can readily be made by a circular slide rule described hereinafter. Other means for performing the calculation may be used if desired.

The invention will be further described in connection with the accompanying drawings, in which.

Figure 1:
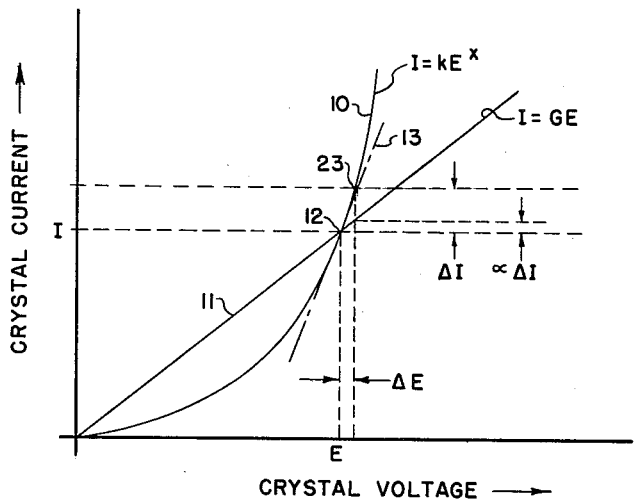
FIG. 1 is a graph explanatory of the operation of the crystal tester of the invention.

Referring to FIG. 1, curve 10 is a plot of the forward voltage-current relationship for a typical crystal diode operated at low levels. The curve is a plot of the general equation $I = kE^x$ and is non-linear when $x$ is greater than 1. It should be noted that the slope of the curve 10 changes continuously for different values of voltage applied across the crystal.

At a given operating point 12, the D.-C. crystal resistance R is equal to $E/I$, and the D.-C. conductance is $I/E$. Straight line 11 represents the voltage-current characteristic of a linear resistor having an R and G equal to the corresponding D.-C. values of the crystal at point 12.

The small signal A.-C. or video resistance and conductance at a given operating point may be determined from the slope of curve 10 at that point. Such a slope is represented by line 13 drawn tangent to curve 10 at point 12. For small increments of current and voltage, $r$ is substantially equal to $\Delta E/\Delta I$ and $g$ is the inverse of $r$.

Figure 2:
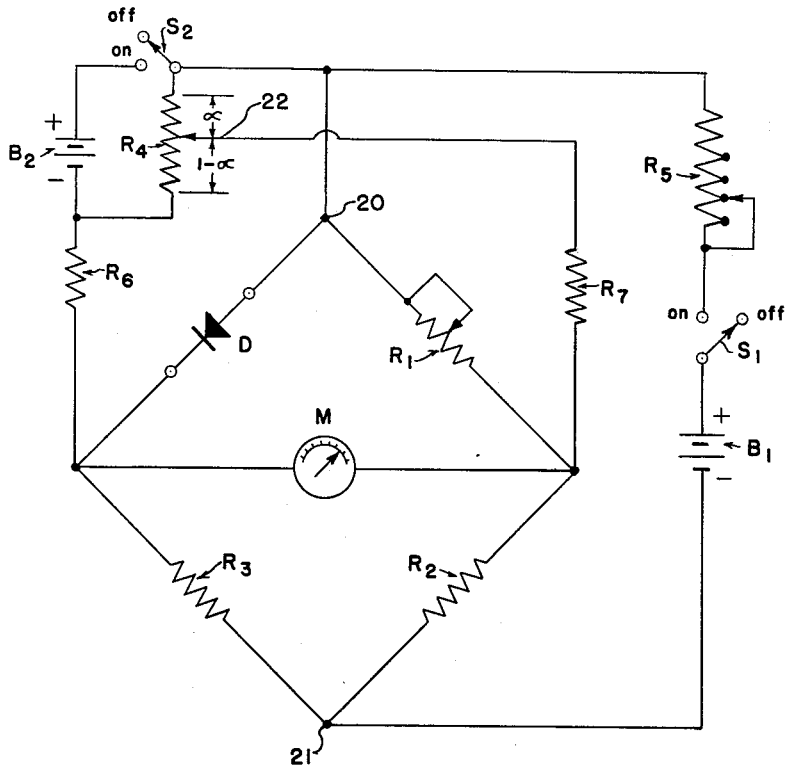
FIG. 2 is a schematic diagram of a preferred embodiment of the tester of the invention.

Referring now to FIG. 2, a crystal diode D to be tested is connected to form one leg of a bridge circuit which includes resistors R1, R2, and R3 in the other three legs. The resistor in one of these legs is variable to permit balancing the bridge. As here shown, resistors R2 and R3 have predetermined resistance values, advantageously equal, and R1 is a calibrated adjustable resistor.

Voltage is supplied to one diagonal of the bridge at terminals 20 and 21 by battery B1 through switch S1 and adjustable resistor R5. Resistor R5 is advantageously large in value compared to the total resistance of the bridge, even when set at minimum value, so as to supply a current to the bridge which is substantially independent of the bridge resistance. Battery B1 and R5 therefore comprise an adjustable substantially constant current supply for the measuring bridge.

To operate the bridge, S1 is closed and R5 set to establish a desired bias current I through the test crystal D (e.g. 10 μamps.). Resistor R5 may be of the step type, and calibrated to give several appropriate values of bias current as selected by the operator. Resistor R1 is then adjusted to effect bridge balance as indicated by a zero reading on meter M. At this setting the resistance value of R1 is equal to the D.-C. resistance R of diode D, assuming that R2 and R3 are equal. Since the currents flowing through R1 and D are equal for the condition of bridge balance, the total current supplied by battery B1 through R5 is twice the crystal current, thus permitting convenient calibration of R5 in terms of crystal bias current.

With switch S1 remaining closed, switch S2 is closed, thereby connecting battery B2 across diode D in series with resistor R6. Resistor R6 is of high resistance value compared to the diode resistance. Hence battery B2 in series with resistor R6 functions as a second independent constant current supply, and causes a small increment of current ΔI to flow through diode D. This produces an incremental voltage drop ΔE across the diode equal to rΔI which unbalances the bridge and causes meter M to deflect.

Potentiometer R4, connected as shown across battery B2, provides an adjustable voltage which is applied from the potentiometer arm 22 through resistor R7 across R1. Resistor R7 is sufficiently large to provide a constant current source for resistor R1, and advantageously is equal to R6.

By adjusting the position of slider 22 until meter M returns to zero, a current αΔI may be caused to flow through resistor R1 which produces a voltage drop thereacross equal to the incremental voltage drop across diode D. Inasmuch as R1 has already been adjusted to equal the D.-C. diode resistance R:

$$\Delta E = r\Delta I = \alpha R \Delta I \quad (16)$$

Accordingly:

$$\alpha = r/R \quad (17)$$

With equal resistors R6, R7 which are large compared to R, α is the proportion of the voltage of battery B2 which is selected by slider 22. Thus potentiometer R4 may be calibrated to read α directly. The resistance of R4 is preferably low compared to R6 and R7.

It will be noted that with R5, R6 and R7 large compared to the bridge resistance so as to provide constant current sources, undesirable interactions are avoided. Thus the branches containing R6 and R7 have negligible effect in the initial bridge balance with switch S2 open. The closing of S2 also has little effect on the value of the current supplied by battery B1. On the other hand, current flow through the branch containing R5 due to battery B2 is negligible compared to that flowing through diode D and resistor R1. Thus with the bridge rebalanced for incremental current flow, there is substantially no incremental current flowing through R2 and R3.

The voltage of battery B1 and the step values of R5 are chosen to provide the desired range of bias currents, say, 5 to 100 microamperes in suitable steps. The voltage of battery B2 will ordinarily be much less than that of B1, and chosen with the values of R6, R7 to give the desired small increment in current. With a microammeter employed for meter M, an incremental current of a couple of microamperes or so may be required to secure a sufficient meter indication. If desired, meter M may be replaced by an amplifier and meter, and still smaller incremental currents employed.

Balancing resistor R1 may be calibrated in kilohms and potentiometer R4 in decimal values from 0 to 1, thereby giving values of R and α directly for computational purposes.

The functioning of the circuit of FIG. 2 may be further explained by referring back to FIG. 1. With switches S1 closed and S2 open, and the bridge balanced by adjusting R1, the desired bias current I flows through crystal D in accordance with the setting of R5. This establishes an operating point such as shown at 12. In balancing the bridge, R1 becomes equal to the D.-C. resistance R of the crystal, and line 11 represents the characteristic of resistance R1 as thus adjusted. The voltage drop E across the crystal D, and also across resistor R1, equal R×I.

The closing of switch S2 then adds an increment of current ΔI through the crystal as shown in FIG. 1, intersecting curve 10 at point 23. This produces a corresponding incremental voltage drop ΔE across the crystal. The adjustment of slider 22 of potentiometer R4 causes a current αΔI to flow through resistor R1 (now equal to R) which gives an incremental voltage drop across the resistor equal to ΔE.

Although point 23 lies on curve 10 rather than on tangent line 13, the slope of a straight line between points 12 and 23 is nearly the same as that of line 13, and as close correspondence as required may be obtained by employing a suitably small increment in current. Hence the ratio of the slopes of lines 13 and 11 is 1/α to a close approximation. Thus, α equals G/g which in turns equals r/R, as given by Equation 17 above.

In the apparatus of FIG. 2, the incremental current adds to the bias current, but if desired the polarity of battery B2 could be reversed so as to subtract an increment.

From the above description, it will be understood that the division of current from battery B1 between paths D—R3 and R1—R2 is independent of the D.-C. resistance of the crystal D when the bridge is initially balanced. With equal resistors R2, R3, at balance R1 will have the same resistance as crystal D and accordingly half the current from battery B1 will flow through crystal D. Thus, step resistor R5 can be calibrated to read the crystal bias current directly. If R2 and R3 are unequal, the current through the two paths will divide unequally but the division at balance will still be independent of the crystal resistance. Accordingly, step resistor R5 can still be calibrated to read crystal bias current directly.

By using a separate source of incremental current and determining the ratio of incremental currents through crystal D and the adjusted balancing resistor R1 that is required to produce the same incremental voltages thereacross, the ratio r/R is obtained at the selected bias current.

The arrangement of FIG. 2 gives the desired results in a simple and direct manner. However it will be understood that changes and modifications may be made by those skilled in the art.

Figure 3:
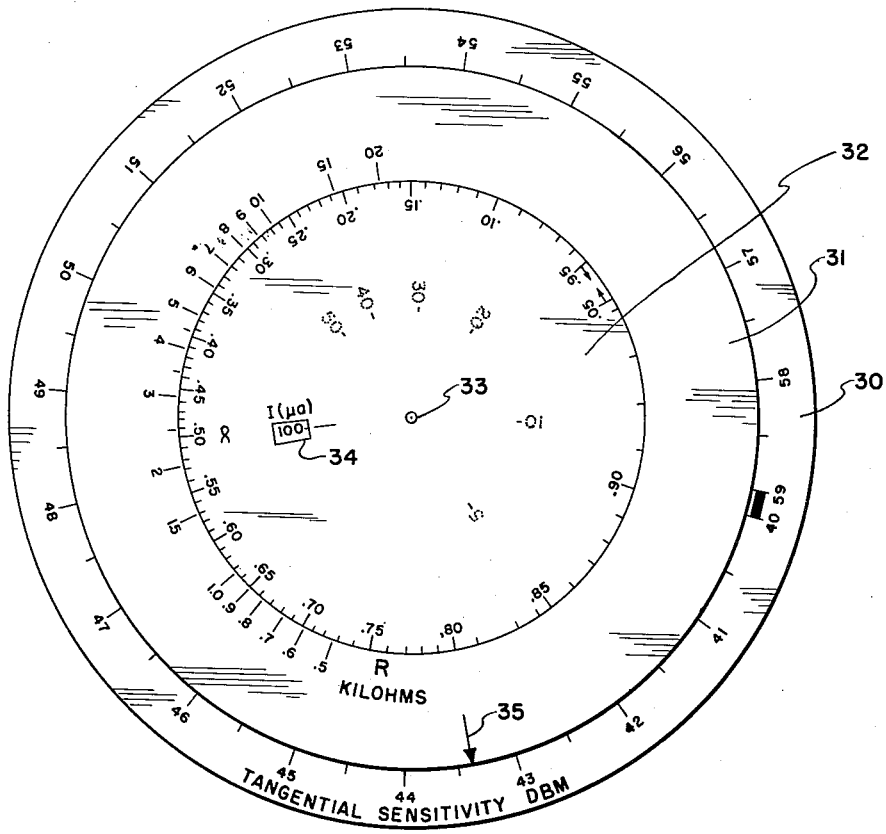
FIG. 3 shows a special circular slide rule adapted to be used in conjunction with the crystal tester of FIG. 2.

Referring now to FIG. 3, there is shown a special circular type slide rule which has been designed to compute the tangential sensitivity for video crystal diodes using the parameters measured by the above-described tester, and Equations 14 and 15 given before. In one specific arrangement the slide rule was designed to compute TS in dbm for a 500 kc. bandwidth. The value of the constant appearing in Equation 14 may be different for different types of crystals to be measured and for different R-F frequency ranges, and may be initially determined by R-F measurements.

The slide rule as shown comprises a main circular base section 30 upon which are mounted a middle disc 31 and a central disc 32. The three discs are free to rotate, each with respect to the other two, about a central mounting pin 33. Values of bias current are inscribed on the base section 30 in position to be exposed through window 34 in central disc 32.

To operate the slide rule, window 34 is initially placed over the bias current value I (100, 50, 40, etc.) which was selected to test the crystal diode in question. Disc 31 is then moved to position the measured value of R opposite the measured value of α found on disc 32. Tangential sensitivity for the diode in question is read on disc 39 opposite arrow 35. Thus with two simple settings of the circular slide rule the tangential sensitivity of a crystal diode can be rapidly computed from the measured values of R and α. The speed and ease with which the above-described measurements and computations can be effected are outstanding advantages of the present invention.

For crystals of significantly different characteristics, involving different constants in Equation 14, several indicating arrows may be employed with appropriate legends.

Although a preferred embodiment of the invention has been described, it is to be understood that various changes and modifications can be made therein without departing from the spirit and scope of the invention.

In the foregoing the testing of microwave video crystal diodes has been particularly described. However, the test apparatus may be found useful in testing other non-linear devices, particularly devices to be used as video detectors, where the parameters determined are found significant.

I claim:

1. Apparatus for testing non-linear devices, particularly crystal diodes and the like, which comprises an electrical bridge circuit having a D.-C. power source connected across one diagonal of said bridge circuit and indicating means connected across the other diagonal thereof, a pair of resistors of predetermined values in respective legs of said bridge circuit, means for connecting a said non-linear device in a third leg of said bridge circuit, an adjustable balancing resistor in a fourth leg of said bridge circuit for balancing said circuit when a said device is connected therein, and D.-C. power means connectable across said device and balancing resistor legs for producing respective increments of current flow therein, said D.-C. power means being adjustable to vary the incremental current through at least one of said device and balancing resistor legs to produce a balanced findication on said indicating means.

2. Apparatus for testing non-linear devices, particularly crystal diodes and the like, which comprises an electrical bridge circuit having a constant-current type D.-C. power supply connected across one diagonal of said bridge circuit and indicating means connected across the other diagonal thereof, a pair of resistors of predetermined values in respective legs of said bridge circuit, means for connecting a said non-linear device in a third leg of said bridge circuit, an adjustable balancing resistor in a fourth leg of said bridge circuit for balancing said circuit when a said device is connected therein, and a second constant-current type D.-C. power supply connectable across said device and balancing resistor legs for producing respective increments of current flow therein, said second D.-C. power supply being adjustable to vary the incremental current through at least one of said device and balancing resistor legs to produce a balanced indication on said indicating means.

3. Apparatus for testing non-linear devices, particularly crystal diodes and the like, which comprises an electrical bridge circuit having first and second diagonal terminals and third and fourth diagonal terminals, said bridge circuit having a pair of resistors of predetermined values connected between said second terminal and respective third and fourth terminals and an adjustable balancing resistor connected between said first and fourth terminals, means for connecting a said non-linear device between said first and third terminals, a power source connected between said first and second terminals and adapted to produce a substantially constant direct-current flow therebetween, indicator means connected between said third and fourth terminals for indicating bridge balance, and power source means connectable between said first and third terminals for producing an increment of direct-current flow through said non-linear device and between said first and fourth terminals for producing a counterbalancing increment of direct-current flow through said balancing resistor.

4. Apparatus for testing non-linear devices, particularly crystal diodes and the like, which comprises an electrical bridge circuit having first and second diagonal terminals and third and fourth diagonal terminals, said bridge circuit having a pair of resistors of predetermined values connected between said second terminal and respective third and fourth terminals and an adjustable balancing resistor connected between said first and fourth terminals, means for connecting a said non-linear device between said first and third terminals, a constant-current type D.-C. supply connected between said first and second terminals and adapted to produce an adjustable amount of current flow therebetween, indicator means connected between said third and fourth terminals for indicating bridge balance, D.-C. power means connectable between said first terminal and said third and fourth terminals for producing respective increments of current flow through said non-linear device and balancing resistor, and means for altering at least one of said current increments to obtain a balance indication on said indicator means.

5. Apparatus for testing non-linear devices, particularly crystal diodes and the like, which comprises an electrical bridge circuit having first and second diagonal terminals and third and fourth diagonal terminals, said bridge circuit having a pair of resistors of predetermined values connected between said second terminal and respective third and fourth terminals and an adjustable balancing resistor connected between said first and fourth terminals, means for connecting a said non-linear device between said first and third terminals, a constant-current type D.-C. supply connected between said first and second terminals and adapted to produce an adjustable amount of current flow therebetween, indicator means connected between said third and fourth terminals for indicating bridge balance, a second constant-current type D.-C. supply connectable between said first terminal and said third and fourth terminals for producing respective increments of current flow through said non-linear device and balancing resistor, and means for altering at least one of said current increments to obtain a balance indication on said indicator means.

6. Apparatus for testing non-linear devices, particularly crystal diodes and the like, which comprises an electrical bridge circuit having first and second diagonal terminals and third and fourth diagonal terminals said bridge circuit having a pair of balanced resistors connected between said second terminal and respective third and fourth terminals and an adjustable balancing resistor connected between said first and fourth terminals, means for connecting a said non-linear device between said first and third terminals, a constant-current type D.-C. supply connected between said first and second terminals adapted to produce an adjustable amount of current flow therebetween, indicator means connected between said third and fourth terminals for indicating bridge balance, said adjustable balancing resistor being calibrated to measure the D.-C. resistance of said non-linear device at bridge balance and said D.-C. supply being calibrated to measure current through said non-linear device at bridge balance, a second constant-current type D.-C. supply connectable between said first terminal and said third and fourth terminals for producing respective increments of current flow through said non-linear device and balancing resistor, and means for altering at least one of said current increments to obtain a balance indication on said indicator means, the last-mentioned means being calibrated to measure the ratio of the incremental currents through said non-linear device and balancing resistor, whereby the D.-C resistance and the ratio of A.-C. to D.-C. resistances of a non-linear device at a selected bias current may be measured.

7. Apparatus for testing non-linear devices, particularly crystal diodes and the like, which comprises an electrical bridge circuit having first and second diagonal terminals and third and fourth diagonal terminals, said bridge circuit having a pair of resistors of predetermined values connected between said second terminal and respective third and fourth terminals and an adjustable balancing resistor connected between said first and fourth terminals, means for connecting a said non-linear device between said first and third terminals, a constant-current type D.-C. supply connected between said first and second terminals including a battery and an adjustable series resistance of resistance high compared to the resistance of the bridge circuit, indicator means connected between said third and fourth terminals for indicating bridge balance, said adjustable balancing resistor being calibrated to measure the D.-C. resistance of said non-linear device at bridge balance and said adjustable series resistance being calibrated to measure current through said non-linear device at bridge balance; and a second constant-current type D.-C. supply for producing respective increments of current flow through said non-linear device and balancing resistor, said second supply including a battery, a resistor and a switch connected in series between said first and third terminals, a potentiometer connected across said battery and resistor connected between the slider of said potentiometer and said fourth terminal, said resistors in said second supply being of high resistance compared to the resistance of the bridge circuit, said potentiometer being adjustable to vary the incremental current through said balancing resistor to obtain a balance indication on said indicator means and being calibrated to measure the ratio of the incremental currents through said non-linear device and balancing resistor, whereby the D.-C. resistance and the ratio of A.-C. to D.-C. resistances of a non-linear device at a selected bias current may be measured.

8. Apparatus for testing microwave video crystal diodes which comprises an electrical bridge circuit having a constant current type D.-C. power supply connected across one diagonal of said bridge circuit and indicating means connected across the other diagonal thereof, a pair of resistors of predetermined values in respective legs of said bridge circuit, means for connecting a crystal diode in a third leg of said bridge circuit, an adjustable balancing resistor in a fourth leg of said bridge circuit for balancing said circuit when a diode is connected therein, said balancing resistor being calibrated to measure the D.-C. resistance of said diode, and a second constant-current type D.-C. power supply connectable across said diode and balancing resistor legs for producing respective increments of current flow therein, said second D.-C. power supply being adjustable to vary the incremental current through at least one of said diode and balancing resistor legs to produce a balanced indication on said indicating means and being calibrated to measure the A.-C. resistance of said diode with respect to said D.-C. resistance value.

9. Apparatus for testing microwave video crystal diodes which comprises an electrical bridge circuit having first and second diagonal terminals and third and fourth diagonal terminals, said bridge circuit having a pair of resistors of predetermined values connected between said second terminal and respective third and fourth terminals and an adjustable balancing resistor connected between said first and fourth terminals, means for connecting a crystal diode between said first and third terminals, a constant-current type D.-C. supply connected between said first and second terminals and adapted to produce an adjustable amount of current flow therebetween, indicator means connected between said third and fourth terminals for indicating bridge balance, a second constant-current type D.-C. supply connectable between said first terminal and said third and fourth terminals for producing respective increments of current flow through said crystal diode and balancing resistor, and means for altering at least one of said current increments to obtain a balance indication on said indicator means, the last-mentioned means being calibrated to measure the ratio of the incremental currents through said crystal diode and balancing resistor.

10. Apparatus for testing microwave video crystal diodes which comprises an electrical bridge circuit having first and second diagonal terminals and third and fourth diagonal terminals, said bridge circuit having a pair of substantially equal resistors connected between said second terminal and respective third and fourth terminals and an adjustable balancing resistor connected between said first and fourth terminals, means for connecting a crystal diode between said first and third terminals, a constant-current type D.-C. supply connected between said first and second terminals including a battery and an adjustable series resistance of resistance high compared to the resistance of the bridge circuit, indicator means connected between said third and fourth terminals for indicating bridge balance, said adjustable balancing resistor being calibrated to measure the D.-C. crystal diode resistance at bridge balance and said adjustable series resistance being calibrated to measure crystal diode current at bridge balance; and second constant-current type D.-C. supply for producing respective increments of current flow through said crystal diode and balancing resistor, said second supply including a battery, a resistor and a switch connected in series between said first and third terminals, a potentiometer connected across said battery and a resistor connected between the slider of said potentiometer and said fourth terminal, said resistors in said second supply being of high resistance compared to the resistance of the bridge circuit, said potentiometer being adjustable to vary the incremental current through said balancing resistor to obtain a balance indication on said indicator means and being calibrated to measure the ratio of the incremental currents through said crystal diode and balancing resistor, whereby the D.-C. resistance and the ratio of A.-C. to D.-C. resistances of a crystal diode at a selected bias current may be measured.

References Cited in the file of this patent

UNITED STATES PATENTS 2,585,353   Strum _____ Feb. 12, 1952